May 8, 1928.

O. NORDSTRÖM 1,669,012

DRIER

Filed Nov. 5, 1926

INVENTOR
Otto Nordström
BY
Wm R Hedlund
his ATTORNEY

Patented May 8, 1928.

1,669,012

UNITED STATES PATENT OFFICE.

OTTO NORDSTRÖM, OF SUNDSVALL, SWEDEN.

DRIER.

Application filed November 5, 1926, Serial No. 146,556, and in Canada December 4, 1925.

My invention relates to drying plants for drying such substances as wood chips. More particularly the invention relates to that type of drying plant or drying tower in which divided material to be dried descends through the tower in a substantially vertical direction while hot gas or hot air passes through the descending material in a substantially horizontal direction for the purpose of drying the material.

Amongst the objects of my invention are to obtain a more efficient drying, a recovery of heat, and a uniform temperature of dried material and gases.

My invention is illustrated on the accompanying drawings of which:

Figure 1:
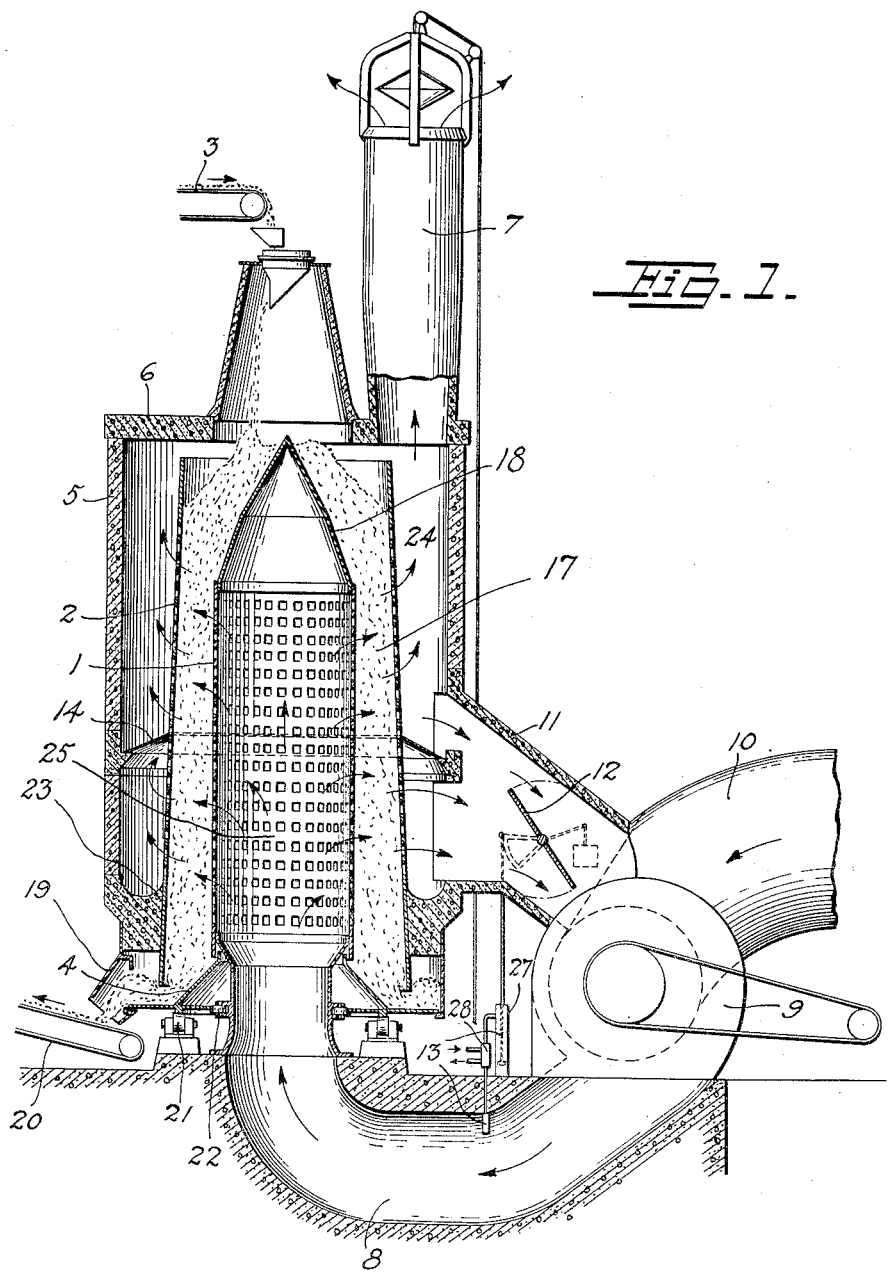
Fig. 1 shows one embodiment of my invention.

Referring more particularly to Fig. 1, reference character 1 designates the inner cylindrical perforated wall of a drying tower. This wall is perforated circumferentially for substantially its entire length. Between inner cylindrical wall 1 and an outer cylindrical wall 2, which is also perforated, is an annular space 17 serving as a passageway for wood chips or other material to be dried. At the top of the inner cylindrical wall 1 is a cone member 18 which directs the material into space 17. Material is received at the upper part of the drier from a belt conveyer 3 or other feeding mechanism.

At the lower end of outer cylindrical wall 2 and spaced therefrom is a rotary bottom 4 which serves as a discharge member for the dried material. The dried material passes between the lower end of cylindrical wall 2 and the rotating bottom and is discharged through an opening 19 on to a member 20 for carrying away the finished product, which member may consist of a belt conveyer, as indicated. The bottom 4 is mounted upon rollers 21 and is guided by rollers 22 and may be driven by any desired mechanical means. A cylindrical brick wall 5 forms the outer casing of the tower proper. In the upper part of the casing is a stack 7 for carrying away gases. The lower part of the wall 5 is brought into the outer wall 2 as indicated at 23. Between wall 5 and outer cylindrical perforated wall 2 is an annular space 24. The brick wall 5 is not perforated.

Hot drying gases are supplied to the central chamber 25 which is the space within inner cylindrical perforated wall 1 and these gases pass through the perforations in wall 1, thence through the material to be dried within space 17, thence through the perforations in wall 2, thence into space 24 and part of the gases then pass into stack 7 and part are diverted by means of a partition 14 to be recirculated back into central chamber 25.

Hot gases are supplied through conduit 10. These gases may, for example, be the waste gases from a boiler or a soda furnace. A blower 9 which may be of any suitable type driven mechanically from any desired type of motor, draws gas from conduit 10 and forces it into passageway 8 which connects with central chamber 25 to supply the gases thereto. Branched into conduit 10 is a recirculating passageway 11 which is connected with casing 5 at substantially the central portion of the outer cylindrical wall 2. Within recirculating conduit 11 is a damper 12 which may be operated to vary the flow of gas through conduit 11. Damper 12 may be operated and preferably is operated by means of a thermostatic member 13 responsive to changes of temperature in the gases supplied to central chamber 25. This thermostatic element may be, as shown, mounted in passageway 8. Reference character 27 designates a servomotor for operating damper 12 and reference character 28 designates a pilot valve for operating servomotor 27. Regulators for operating dampers are known and any of various types may be used for my drying plant.

The most important feature of my invention is the member 14 which might be termed a partition, a baffle, or a shelf. This partition is inserted between the outer perforated wall 2 and the surrounding brick wall 5 at about the middle portion of the tower. The baffle extends in a substantially horizontal direction and is arranged so that its outer circumference lies within the opening of recirculating conduit 11. The partition 14 operates to direct the gases which pass through that portion of the material which is below the partition into the recirculating conduit since this portion of the gas passes back through blower 9 to be recirculated through the material to be dried. As the material passes downwardly through space 17, it becomes drier as it progresses until the material at the lower end of space 17 is quite dry. Consequently the gases passing through the lower portion of space 17 do not have so much moisture to take up as the gases passing through the upper portion of the material to be dried. The drying possibilities of the lower strata of gas are therefore not fully utilized and I recirculate this portion in order to obtain improved results. Partition 14 is situated so that, when damper 12 is open an appreciable extent, a portion of the gas passing through the tower at a higher level than that of the partition is also returned to the blower and to chamber 25. Furthermore, if damper 12 is entirely or substantially closed, gases passing through the portion of the material which is below baffle 14 pass around the edge of baffle 14 and upwardly to stack 7. For any particular tower, the partition 14 may be adjusted at that position which gives the best results. The gas which is not recirculated passes upwardly through space 24 and through stack 7 to be dispersed into the atmosphere. By means of the apparatus above described only fully saturated and fully utilized gas escapes to the stack.

Figure 2:
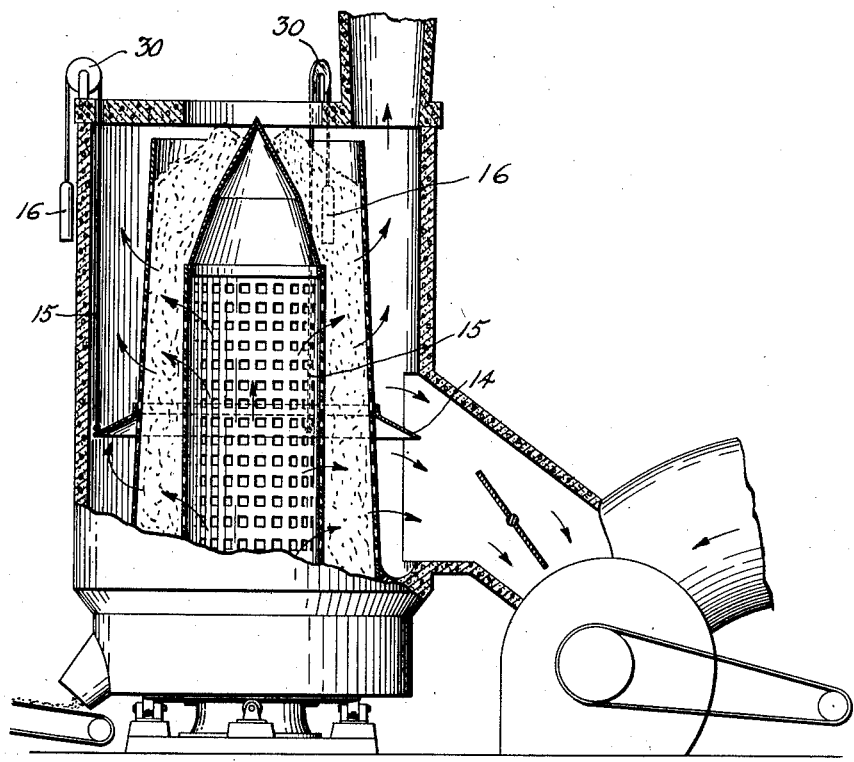
Fig. 2 shows a second embodiment.

In the embodiment shown in Fig. 2, the partition 14 is arranged upon a series of flexible members such as wires 15 which pass over pulleys 30 and are connected to counterweights 16 for the purpose of altering the height of partition 14. If desired, the adjustment of partition 14 may be automatically controlled in accordance with the temperature of exhaust gases.

While I have described my invention as applied to one or more forms of apparatus, it is to be understood that the invention is not limited to the embodiments herein disclosed and described.

What I claim is:

1. In a drying plant, in combination, members forming a vertically extending annular compartment for the reception of material to be dried and surrounding a central chamber, a casing wall surrounding said members forming a space surrounding said compartment, a conduit for supplying gas to said central chamber, a stack connected to the upper portion of said casing, a recirculating conduit connecting the lower portion of said casing with the conduit for supplying gas to the central chamber and a horizontal baffle shelf between said annular compartment and the casing arranged above a portion of the recirculating conduit.

2. In a drying plant, in combination, members forming a space for the reception of material to be dried, means to supply drying fluid to said space, an outlet for carrying away fluid from said space, a conduit for recirculating fluid from said space and back to said space, a damper in said conduit, automatic means for controlling said damper and baffling means for directing the relative amounts of fluid passing into said outlet and said conduit.

3. In a drying plant, in combination, vertical members forming a space for the reception of material to be dried, means to supply drying fluid to said space, an outlet for carrying away fluid from said space, a conduit for recirculating fluid from said space and back to said space, a damper in said conduit, automatic means responsive to variations of temperature in the fluid supplied to said space for controlling said damper and baffling means for directing the relative amounts of fluid passing into said outlet and said conduit.

4. In a drying plant, in combination, a vertically extending annular compartment for the reception of material to be dried, a casing wall surrounding said members and forming a space surrounding said compartment, a supply conduit connected with the center of said compartment, a stack connected to the upper portion of said casing, a recirculating conduit connecting the lower portion of said casing with said supply conduit, a baffle within the space surrounding said compartment arranged to define paths of flow through said compartment and means for controlling flow through said recirculating conduit.

5. A drying plant comprising an inner wall adapted for passage of gas therethrough, an outer wall adapted for passage of gas therethrough, said walls forming between them a vertically disposed annular space for the reception of material to be dried through which gas is adapted to pass, a gas supply conduit connected to the space within the inner wall for supplying gas thereto, means forming a vertically extending outer annular space outside the outer wall, a stack for removing gas from the upper part of the outer annular space, a recirculating conduit arranged to receive gas from the outer annular space and connected to the gas supply conduit, a baffle shelf situated within the outer annular space and arranged opposite the connection of the recirculating conduit with the outer annular space and a damper in the recirculating conduit for controlling flow of gas therethrough.

6. A drying plant comprising an inner wall adapted for passage of gas therethrough and forming a central chamber, an outer wall adapted for passage of gas therethrough, said walls forming between them a vertically disposed annular space for the reception of material to be dried through which gas is adapted to be passed, a gas supply conduit connected to the bottom of the central chamber for supplying gas thereto, a wall forming a vertically extending outer annular space around the said outer wall, a horizontal baffle shelf arranged substantially midway of the outer annular space and separating the outer annular space into two parts, one above the other, a stack for removing gas from the upper part of the outer annular compartment, a recirculating conduit connected to remove gas from the lower part of the outer annular space and connected to supply gas to the gas supply conduit and a damper in the recirculating conduit for controlling flow of gas therethrough.

7. A drying plant comprising an inner wall adapted for passage of gas therethrough and forming a central chamber, an outer wall adapted for passage of gas therethrough, said walls forming between them a vertically disposed annular space for the reception of material to be dried through which gas is adapted to be passed, a gas supply conduit connected to the bottom of the central chamber for supplying gas thereto, a wall forming a vertically extending outer annular space around the said outer wall, a horizontal baffle shelf arranged substantially midway of the outer annular space and separating the outer annular space into two parts, one above the other, a stack for removing gas from the upper part of the outer annular compartment, a recirculating conduit connected to remove gas from the lower part of the outer annular space and connected to return gas to the central chamber and a damper in the recirculating conduit for controlling flow of gas therethrough.

8. A drying plant comprising an inner wall adapted for passage of gas therethrough and forming a central chamber, an outer wall adapted for passage of gas therethrough, said walls forming between them a vertically disposed annular space for the reception of material to be dried through which gas is adapted to be passed, a gas supply conduit connected to the bottom of the central chamber for supplying gas thereto, a wall forming a vertically extending outer annular space around the said outer wall, a horizontal baffle shelf arranged substantially midway of the outer annular space and separating the outer annular space into two parts, one above the other, a stack for removing gas from the upper part of the outer annular compartment, a recirculating conduit connected to remove gas from the lower part of the outer annular space and connected to supply gas to the gas supply conduit, and means responsive to variations of temperature in the gas supplied to the central chamber for controlling said temperature.

In testimony whereof I hereunto affix my signature.

OTTO NORDSTRÖM.